United States Patent Office 3,211,602
Patented Oct. 12, 1965

3,211,602
POLYTRIFLUOROCARBON ADHESIVE COMPRISING AN ALPHA-CARBOXYMETHYLACRYLATE COPOLYMER REACTED WITH AN EPOXY AND A POLYAMINO-POLYAMIDE RESIN
Harold R. Horstman, Los Alamos, N. Mex., assignor to the United States of America as represented by the United States Atomic Energy Commission
No Drawing. Filed May 5, 1961, Ser. No. 108,210
3 Claims. (Cl. 156—330)

This invention relates to the bonding of fluorocarbon plastics using a resin adhesive and more particularly bonding of chlorotrifluoroethylene polymers and copolymers to themselves or to other substances.

Certain plastic polymers containing fluorine as part of their composition possess extraordinary resistance to solvents and chemical attack but they are also highly resistant to wetting by water, solvents, cements and adhesives of every known kind. Thus it has been impossible in the past to bond them with adhesives (except low strength pressure sensitive types) unless an expensive and inconvenient surface treatment is undergone prior to the application of the adhesive.

This property of high resistance to solvents is characteristic of polymerized organic fluorine compounds and specifically the compound poly(chlorotrifluoroethylene) which is known commercially under the trademarks Kel-F, Fluorothene, Aclar, Genetron, etc.

It is, therefore, an object of the present invention to overcome the resistance of bonding offered by this and similar plastic organic compounds by using a suitable resin adhesive.

In the following description of the preparation of the adhesive material and its application trade-names of the plastics are used for brevity.

Example 1

The adhesive is prepared by mixing 2.5 parts by weight of an acrylic polymer having the approximate general formula:

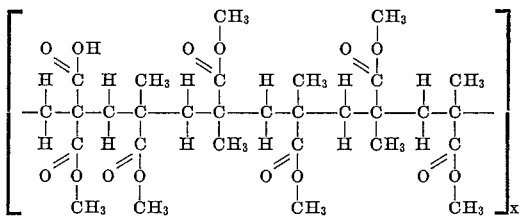

with 7.5 parts by weight of methyl ethyl ketone, then adding 3 parts by weight of Epon 828, the condensation product of epichlorohydrin and bis (4-hydroxyphenyl) dimethyl methane having a viscosity of 135 to 195 poises at 25° C., finally add 7 parts by weight of Versamid 140, the condensation product of dimerized linoleic acid and diethylene triamine having an amine number in the range of 350 to 400 and a viscosity of 125 to 175 poises at 25° C., and stir the mixture until homogeneous and fluid. With the adhesive prepared one can brush or spray (additional solvent methyl ethyl ketone would be required to reduce the viscosity of the mixture in order to spray) a coat of the adhesive on the surfaces of the material to be bonded, in this case Kel-F, allow the ketone solvent to evaporate at room temperature approximately 25 to 40 minutes, press together the two Kel-F surfaces and clamp with sufficient pressure to maintain contact of the coated surfaces, then place the bonded material in a 160° F. oven and cure for a minimum of 4 hours.

Example 2

Using the above outlined method to prepare the adhesive and curing the bonded material at a temperature of about 220° F. for approximately one-half hour the adhesive obtains a peel strength of 32 pounds per inch and a shear strength of 595 pounds per square inch.

Example 3

Using the above outlined method to prepare the adhesive and curing the bonded material at a temperature of about 130° F. for approximately 16 hours the adhesive obtains a peel strength of 30 pounds per inch and a shear strength of 480 pounds per square inch.

Example 4

The best embodiment of the present invention is obtained when the bonded material is cured 4 hours at a temperature of approximately 190° F. at which point it develops a peel strength of 50 pounds per inch and a shear strength of 635 pounds per square inch. Along with the variations in temperature and cure time the applicant has varied the composition of the adhesive material with success in the following manner: using 5 parts by weight of A-916-B which is the condensation product of a 5:1 mixture of methylmethacrylate and a carboxymethylacrylate yielding an average polymeric unit chain having the formula as shown in column 1 of the specification, various amounts of ketone solvent and .25 to 7.5 parts by weight of the polyamide, Versamid 140, as defined in column 1 and using no epoxy resin. The best peel strength of the adhesive without the epoxy resin was when the weight ratio was 10:1 or 5 parts of the carboxylated acrylic polymer (A-916-B) as defined above, to .5 part by weight of the Versamid 140 (as defined in column 1). However, it was found that the addition of the epoxy resin gives the adhesive greater strength and therefore it is preferable to add the epoxy resin as outlined in Example 1. As a substitute for the A-916-B, as defined above, a solution of essentially pure polymethyl methacrylate was prepared by dissolving "Lucite 29" in an 80/20 mixture of toluene/methanol; this, when combined with the epoxy resin and a polyamine such as diethylene triamine, was also effective as an adhesive for poly(chlorotrifluoroethylene).

It is understood that the examples given above are illustrative only and various changes in detailed procedure are within the scope of the invention. For example, the adhesive could be prepared by reacting any polyamine with (the ester and/or carboxyl groups of) an acrylic resin or any polyfunctional esters, and an epoxy resin.

What is claimed is:

1. The method of joining chlorotrifluoroethylene polymers and copolymers to themselves and other materials comprising applying to the surfaces to be joined coatings of the condensation product of a 5:1 mixture of methylmethacrylate and a carboxymethylacrylate yielding an average polymeric unit chain having the formula:

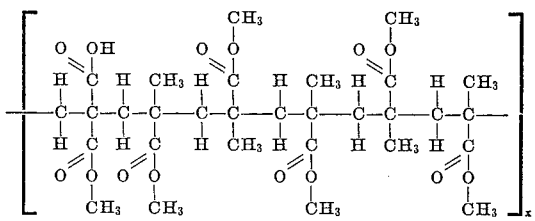

the condensation product of dimerized linoleic acid and diethylene triamine having an amine number in the range of 350 to 400 and a viscosity of 125 to 175 poises at 25° C., and the condensation product of epichlorohydrin and bis (4-hydroxyphenyl) dimethyl methane having a viscosity of 135 to 195 poises at 25° C., combined in the range of ratios from 2.5–7–3 to 5.0–0.25–0.0 parts by weight respectively, allowing said coating to dry to tackiness, pressing the coated surface together and curing the joined material and adhesive.

2. The method of claim 1 where the minimum curing time is 30 minutes at a temperature of about 220° F.

3. The method of claim 1 where the minimum curing temperature is 130° F. and the curing time is 4 hours.

References Cited by the Examiner
UNITED STATES PATENTS

| | | |
|---|---|---|
| 2,604,464 | 7/52 | Segall et al. |
| 2,705,223 | 3/55 | Renfrew et al. ---------- 260—18 |
| 2,798,861 | 7/57 | Segall et al. |
| 2,809,130 | 10/57 | Rappaport ------------ 161—184 |
| 2,865,702 | 12/58 | Bruner. |
| 2,925,403 | 2/60 | Shokal. |
| 3,008,914 | 11/61 | Fry. |
| 3,018,260 | 1/62 | Creighton ------------- 260—18 |
| 3,048,552 | 8/62 | Fang ----------------- 156—330 |
| 3,063,882 | 11/62 | Rutledge ------------- 161—184 |
| 3,067,078 | 12/62 | Gluck ---------------- 161—184 |
| 3,099,632 | 7/63 | De Crease. |
| 3,133,854 | 5/64 | Simms --------------- 161—189 |

OTHER REFERENCES

Industrial and Eng. Chemistry, Vol. 49, (1957) pages 1091–1094.

Lee et al., Epoxy Resins, pps. 10, 284–5, McGraw Hill Book Co., N.Y., 1957.

LEON J. BERCOVITZ, *Primary Examiner.*

WILLIAM H. SHORT, *Examiner.*